No. 757,996. PATENTED APR. 19, 1904.
C. R. DAVIS.
SULKY PLOW.
APPLICATION FILED JAN. 20, 1904.
NO MODEL.
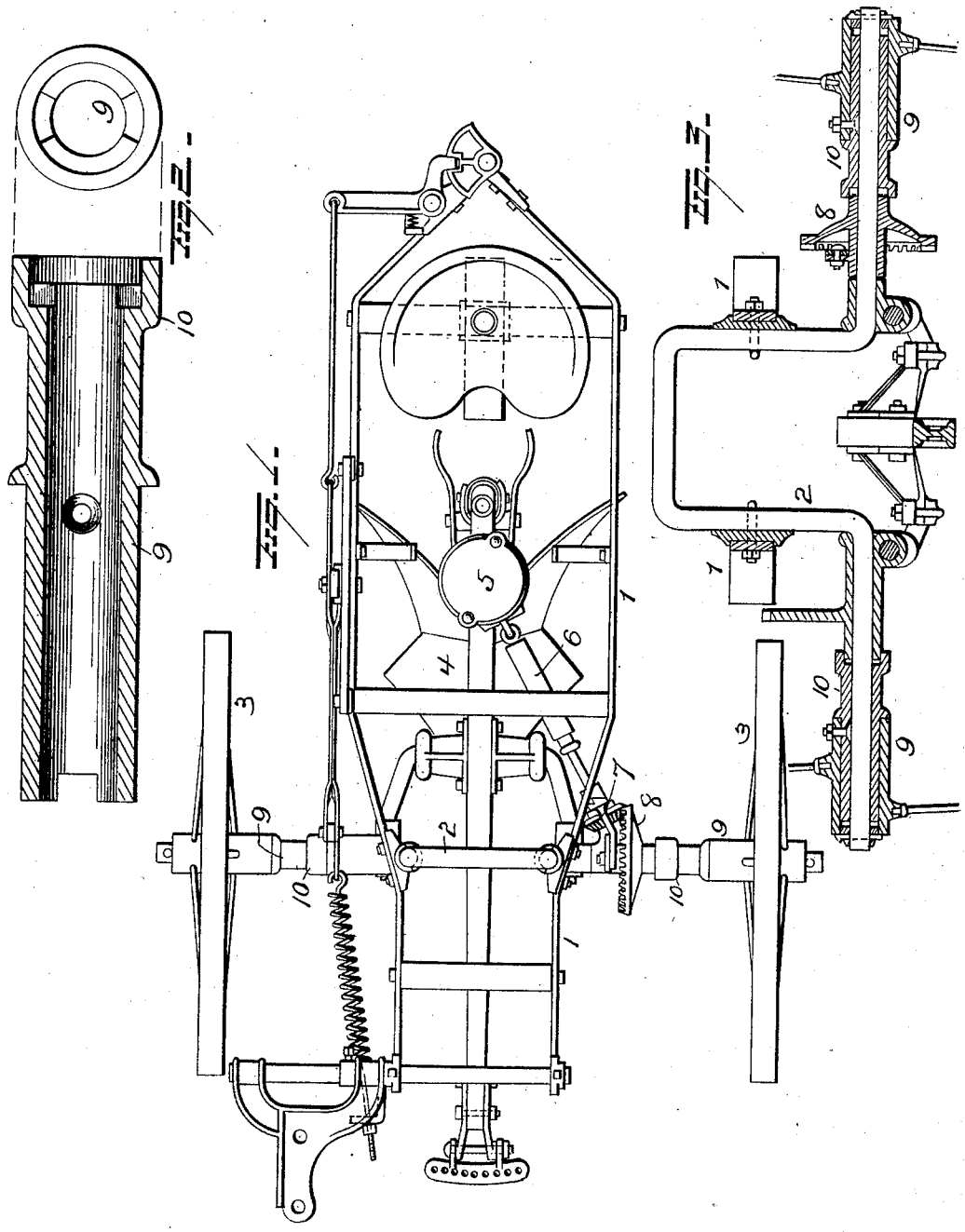

No. 757,996. Patented April 19, 1904.

UNITED STATES PATENT OFFICE.

CALVIN R. DAVIS, OF SOUTH BEND, INDIANA, ASSIGNOR TO OLIVER CHILLED PLOW WORKS, OF SOUTH BEND, INDIANA.

SULKY-PLOW.

SPECIFICATION forming part of Letters Patent No. 757,996, dated April 19, 1904.

Original application filed April 9, 1903, Serial No. 151,831. Divided and this application filed January 20, 1904. Serial No. 189,860.

(No model.)

*To all whom it may concern:*

Be it known that I, CALVIN R. DAVIS, a resident of South Bend, in the county of St. Joseph and State of Indiana, have invented certain new and useful Improvements in Sulky-Plows; and I do hereby declare the following to be a full, clear, and exact description of the invention, such as will enable others skilled in the art to which it appertains to make and use the same.

My invention relates to improvements in sulky-plows, this application being a division of application for patent filed by me April 9, 1903, Serial No. 151,831.

The invention consists in certain novel features of construction and combinations and arrangements of parts, as will be more fully hereinafter described, and pointed out in the claim.

In the accompanying drawings, Figure 1 is a plan view illustrating the application of my improvements to a sulky lister plow and planter. Fig. 2 is a combined view in longitudinal section and end elevation of a wheel-hub, and Fig. 3 is a view in cross-section.

1 represents a frame supported near its forward end on an axle 2, carried by traction-wheels 3. Frame 1 carries a lister 4 and seed-box 5, from which the seed are ejected or permitted to drop when shaft 6 is turned to operate mechanism (not shown) in the bottom of said seedbox. This shaft 6 has a pinion 7 thereon in mesh with a driving-gear 8 on axle 2, operated by one of traction-wheels 3, as will be now explained.

The hubs 9 of wheels 3 are elongated on one side, as shown at 10, and have sand-bands integral therewith. At times it becomes necessary to contract or widen the traction of the lister, according to whether single or double listing is done and in order to have the traction-wheels follow the ridges properly as formed by the lister-base. In order to have the adjustment of the traction-wheels as simple as possible for the operator, the wheel-boxes are extended to one side a distance of one-half of the necessary adjustment, so that by reversing both traction-wheels on the axle the proper gage is had. Thus when the wheels are in the position shown a wide gage is had and when reversed, with the hub extensions 10 outward, a narrow gage is the result. One of these wheel-hubs is made with internal notches at both ends, so that when in either position it will clutch with lugs on the hub of driving-gear 8, supported to turn on the axle.

A great many slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

The combination with a frame, a lister carried thereby, and an axle secured to the frame, of seed-dropping mechanism, a driving-gear on the axle for operating the seed-dropping mechanism, wheels on the axle having hubs more elongated on one side of the wheels than at the other sides thereof to vary the gage of the wheels by reversing them on the axle, and one of said hubs having coöperating clutch mechanism at both ends to lock with similar mechanism on the gear, when the wheels are in either position.

In testimony whereof I have signed this specification in the presence of two subscribing witnesses.

CALVIN R. DAVIS.

Witnesses:
EDWIN NICAR,
F. C. NIPPOLD.